United States Patent
Bogdanov et al.

(10) Patent No.: US 10,365,134 B2
(45) Date of Patent: Jul. 30, 2019

(54) VORTEX FLOWMETER WITH REDUCED INTRUSION BY PROVIDING PIEZOELECTRIC SENSORS EXTERNALLY OF THE FLOW TUBE

(71) Applicant: Rosemount Inc., Chanhassen, MN (US)

(72) Inventors: Vladimir Bogdanov, Chelyabinsk (RU); Alexander Konyukhov, Chelyabinsk (RU); Alexey Krivonogov, Chelyabinsk (RU); Vladimir Repyevsky, Chelyabinsk (RU); Jeffry Foster, St. Louis Park, MN (US)

(73) Assignee: Micro Motion Inc., Boulder, CO (US)

( * ) Notice: Subject to any disclaimer, the term of this patent is extended or adjusted under 35 U.S.C. 154(b) by 75 days.

(21) Appl. No.: 15/358,718

(22) Filed: Nov. 22, 2016

(65) Prior Publication Data

US 2018/0023985 A1    Jan. 25, 2018

Related U.S. Application Data

(63) Continuation of application No. PCT/RU2016/000469, filed on Jul. 21, 2016.

(51) Int. Cl.
    *G01F 1/32* (2006.01)
(52) U.S. Cl.
    CPC ............ *G01F 1/329* (2013.01); *G01F 1/3263* (2013.01)
(58) Field of Classification Search
    CPC ..................................................... G01F 1/32
    See application file for complete search history.

(56) References Cited

U.S. PATENT DOCUMENTS

| | | | | |
|---|---|---|---|---|
| 3,946,608 A | * | 3/1976 | Herzl | G01F 1/3263 73/861.24 |
| 4,019,384 A | * | 4/1977 | Herzl | G01F 1/3263 73/861.24 |
| 4,171,643 A | | 10/1979 | Frick | |
| 4,186,599 A | | 2/1980 | Frick | |
| 4,197,739 A | | 4/1980 | Frick | |
| 4,372,046 A | | 2/1983 | Suzuki | |
| 4,448,081 A | * | 5/1984 | Kolitsch | G01F 1/28 73/861.03 |
| 4,464,939 A | | 8/1984 | Corpon | |
| 4,475,405 A | | 10/1984 | Corpron et al. | |
| 4,520,678 A | * | 6/1985 | Koziol | G01F 1/3254 73/861.24 |
| 4,926,695 A | | 5/1990 | Kleven | |
| 4,966,040 A | * | 10/1990 | Ohmae | G01F 1/3281 73/861.22 |

(Continued)

OTHER PUBLICATIONS

Search Report and Written Opinion for International Patent Application PCT/RU2016/000469, dated Mar. 23, 2017, 6 pages.

*Primary Examiner* — Harshad R Patel
(74) *Attorney, Agent, or Firm* — Christopher R. Christenson; Kelly, Holt & Christenson PLLC (57) ABSTRACT

A vortex flowmeter includes a flow tube having a first end and a second end. A shedder bar is disposed within the flow tube between the first end and the second end. The shedder bar is configured to generate vortices in fluid flowing through the flow tube. At least one sensor is operably coupled to an external surface of the flow tube and is configured to detect individual deformations of the flow tube resulting from vortices inside the flow tube.

17 Claims, 8 Drawing Sheets

(56) References Cited

U.S. PATENT DOCUMENTS

| | | | |
|---|---|---|---|
| 4,995,269 A * | 2/1991 | Mon | G01F 1/3218 73/861.22 |
| 5,031,460 A * | 7/1991 | Kanenobu | F02M 65/003 73/114.43 |
| 5,343,762 A | 9/1994 | Beulke | |
| 5,396,810 A | 3/1995 | Beulke | |
| 5,429,001 A | 7/1995 | Kleven | |
| 5,503,035 A * | 4/1996 | Itoh | G01F 1/3209 73/861.19 |
| 5,627,322 A * | 5/1997 | Osterloh | G01F 1/3263 73/861.21 |
| 6,053,053 A | 4/2000 | Huotari | |
| 6,257,071 B1 * | 7/2001 | Dessert | G01F 1/3254 73/861.22 |
| 6,412,353 B1 | 7/2002 | Kleven et al. | |
| 6,463,813 B1 * | 10/2002 | Gysling | G01L 7/04 73/579 |
| 6,615,673 B1 * | 9/2003 | Cullie | G01F 1/3218 73/861.21 |
| 6,651,512 B1 | 11/2003 | Kleven et al. | |
| 6,658,945 B1 | 11/2003 | Kleven | |
| 6,675,661 B1 * | 1/2004 | Peters | G01F 1/3218 73/861.22 |
| 6,957,588 B1 * | 10/2005 | Kicher | G01L 9/0027 73/720 |
| 6,973,841 B2 | 12/2005 | Foster | |
| 7,073,394 B2 | 7/2006 | Foster | |
| 7,290,450 B2 * | 11/2007 | Brown | G01F 1/666 73/579 |
| 7,644,633 B2 | 1/2010 | Schmidt et al. | |
| 7,836,780 B2 | 11/2010 | Garnett et al. | |
| 8,234,931 B2 * | 8/2012 | Cheng | G01F 1/3218 73/861.22 |
| 8,250,924 B2 * | 8/2012 | Hedtke | G01H 11/08 73/861.21 |
| 8,408,071 B1 * | 4/2013 | Feller | G01F 1/3218 73/861.23 |
| 8,459,127 B2 * | 6/2013 | Shumilov | G01F 1/3209 73/861.24 |
| 8,544,342 B1 * | 10/2013 | Feller | G01F 1/3218 73/861.24 |
| 8,567,259 B1 * | 10/2013 | Ballard | G01F 1/3209 73/861.22 |
| 8,596,141 B2 | 12/2013 | Konyukhov et al. | |
| 8,844,371 B2 * | 9/2014 | Limacher | G01F 1/74 73/861.04 |
| 9,016,138 B2 | 4/2015 | Brand | |
| 9,157,775 B2 * | 10/2015 | Strom | G01F 1/3218 |
| 9,250,108 B2 * | 2/2016 | Wiklund | G01F 1/46 |
| 2004/0226386 A1 * | 11/2004 | Gysling | G01F 1/7082 73/861.42 |
| 2005/0201567 A1 * | 9/2005 | Browne | G10K 11/178 381/71.5 |
| 2008/0294293 A1 * | 11/2008 | Yamamoto | F16K 31/126 700/282 |
| 2009/0326839 A1 * | 12/2009 | Rogers | G01F 1/3209 702/47 |
| 2010/0307262 A1 * | 12/2010 | Lewicke | G01F 1/3209 73/861.22 |
| 2012/0192657 A1 * | 8/2012 | Gossner | G01F 1/329 73/861.22 |
| 2013/0199305 A1 * | 8/2013 | Fernald | G01F 1/708 73/861.18 |
| 2014/0260658 A1 * | 9/2014 | Strom | G01F 1/3218 73/861.01 |
| 2015/0040684 A1 * | 2/2015 | Newton | G01F 1/3209 73/861.22 |
| 2015/0177033 A1 * | 6/2015 | Clarke | G01F 1/56 73/861.21 |
| 2015/0323356 A1 * | 11/2015 | Brosnihan | G01F 1/3218 73/861.24 |

\* cited by examiner (PRIOR ART)

| Q<br>Flow rate | Reference<br>K-factor | Fvortex<br>calculation | Fvortex<br>test | ΔUpf test |
|---|---|---|---|---|
| m³/h | | Hz | Hz | mV |
| 30 | 10.69 | 23.52 | 38.2 | 2 |
| 60 | 10.69 | 47.05 | 47.7 | 4 |
| 90 | 10.69 | 70.57 | 66.8 | 7 |
| 130 | 10.69 | 101.94 | 95.4 | 40 |

VORTEX FLOWMETER WITH REDUCED INTRUSION BY PROVIDING PIEZOELECTRIC SENSORS EXTERNALLY OF THE FLOW TUBE

BACKGROUND

Vortex flowmeters are used in the industrial process control field for measuring a flow rate of a fluid. Vortex flowmeters are typically inserted in a flow pipe or conduit that carries the fluid to be measured. Industry applications include petroleum, chemical, pulp and paper, mining and materials, oil and gas, for example.

The operating principle of a vortex flowmeter is based on a phenomenon of vortex shedding known as the von Karman effect. As fluid passes a shedding bar or "bluff body", it separates and generates small eddies or vortices that are shed alternately along and behind each side of the bluff body. These vortices cause areas of fluctuating flow and pressure that are detected by a sensor. Various different types of sensors are currently in use for detecting such vortices including force sensors, piezoelectric dynamic pressure sensors, or differential pressure sensors, for example. The frequency of vortex generation is essentially proportional to fluid velocity.

The vortex sensors currently used to sense vortices in vortex flowmeters are generally relatively complex and may require a costly design. Further, such sensors require additional fasteners and a robust seal since the sensor or some other suitable structure, must be inserted into the flow tube in order to interact with the vortices for detection. Accordingly, the process fluid is brought into direct contact with such structure and the process intrusion itself must be sealed carefully in order to ensure that process fluid does not leak.

SUMMARY

A vortex flowmeter includes a flow tube having a first end and a second end. A shedder bar is disposed within the flow tube between the first end and the second end. The shedder bar is configured to generate vortices in fluid flowing through the flow tube. At least one sensor is operably coupled to an external surface of the flow tube and is configured to detect individual deformations of the flow tube resulting from vortices inside the flow tube.

DETAILED DESCRIPTION

Figure 1:
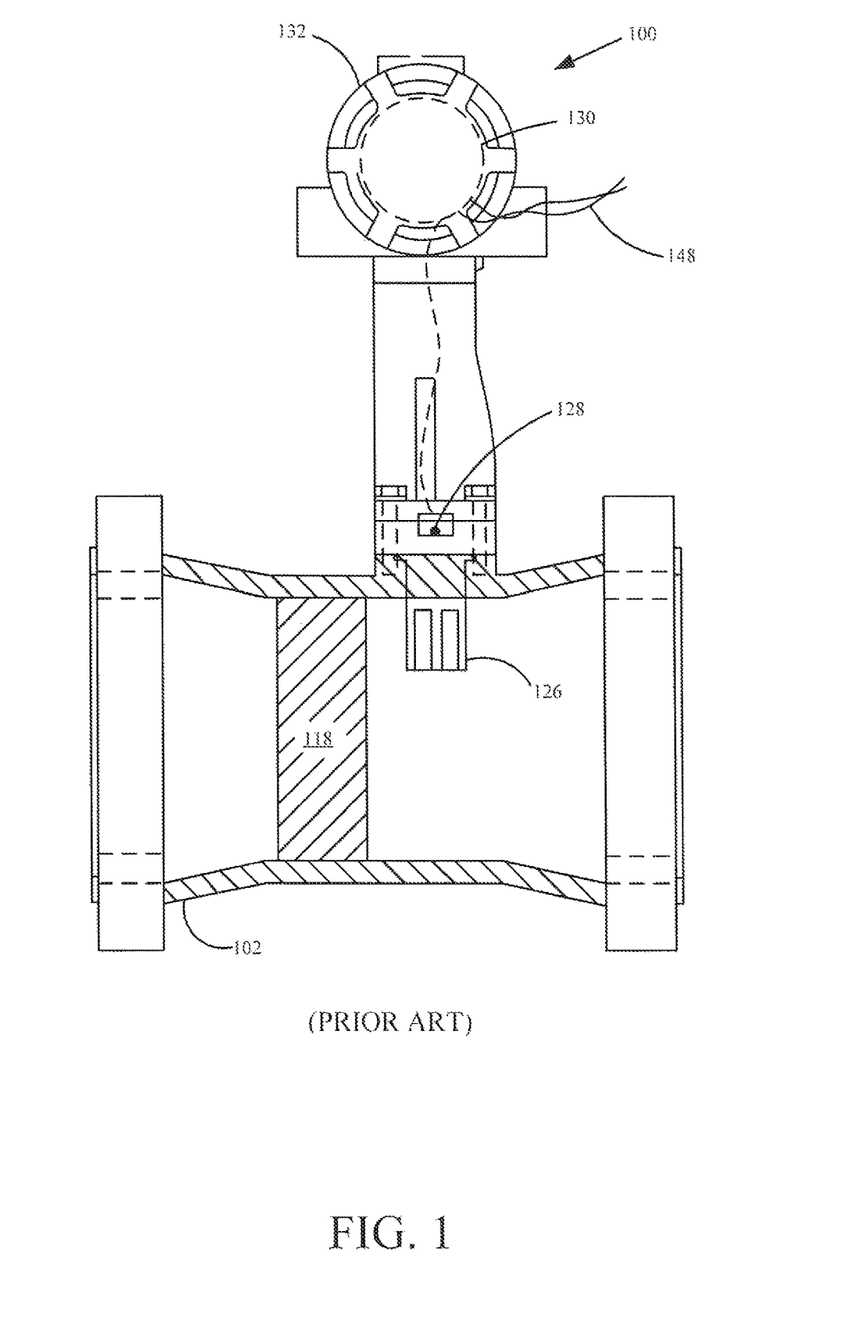
FIG. 1 is a diagrammatic view of a vortex flowmeter in accordance with the prior art.

FIG. 1 is a diagrammatic view of a vortex flowmeter in accordance with the prior art. Vortex flowmeter 100 includes a flow tube 102 that conveys a fluid therethrough. The fluid flow can be a liquid, gas, or combination thereof (such as saturated steam). Flow tube 102 is generally attached to a pair of flanges that allow the assembly to be mounted to corresponding flanges of a section of pipe. Accordingly, each of the flanges may include mounting holes (illustrated in phantom), that allow each flange to be mounted to a respective flange of a fluid piping system.

As shown in FIG. 1, vortex flowmeter 100 includes a shedder bar 118 that is positioned within flow tube 102 extending from a top portion thereof to a bottom portion thereof. Further, if flow tube 102 were viewed along its axis, shedder bar 118 would typically be positioned in the center of flow tube 102 extending from the center of the top-most portion of flow tube 102 to the center of the bottom-most portion of flow tube 102. However, vortex flowmeters can be practiced with shedding bars that are positioned in other orientations as well as shedding bars that do not completely span the entire inner diameter of the flow tube. As fluid flows past shedder bar 118, vortices are generated in the fluid flow. These vortices are referred to as a von Karman vortex street. The vortices are present as the fluid flow passes a downstream position proximate sensing apparatus 126. The vortices physically interact with apparatus 126 causing subtle movements and vibrations is apparatus 126. These movements may be transduced or otherwise sensed by a sensor, such as sensor 128 that is electrically coupled to electronics 130 within housing 132. Accordingly, a vortex flowmeter will typically comprise a flow tube assembly and an electronics assembly which, combined, may be referred to as a vortex flow transmitter. Electronic circuitry 130 within housing 132 generally converts the sensor signal to a standardized transmission signal that is provided to output leads 148 for transmission to another suitable device, such as a process controller or valve controller.

As can be seen in FIG. 1, above, previous vortex flowmeter designs generally provide a structure disposed within the flow tube proximate the shedder bar in order to detect or otherwise sense the vortices. As such, the structure must be carefully sealed so that process fluid does not leak out of flow tube 102. Further, the process fluid interacts directly with the structure or sensor disposed within the flow tube and can cause damage, or wear on the sensing structure.

Embodiments of the present invention generally remove the internal vortex sensing structure, such as structure 126, or other types of sensors, from within the flow tube and measure or detect pressure pulsation vortices externally on the flow tube. In one embodiment, the pressure pulsation vortices are detected using a plurality of strain-based piezoelectric film sensors that are mounted on the outside wall of the flow tube of the vortex flowmeter.

Figure 2A:
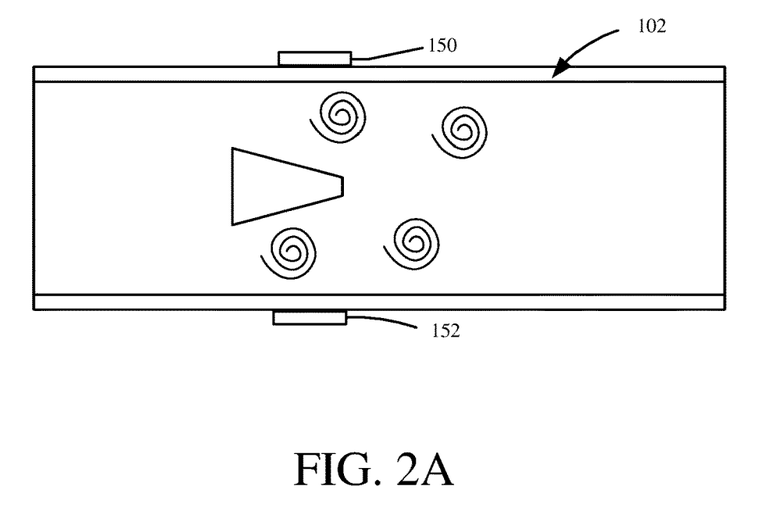
FIG. 2A is a diagrammatic view of a portion of a flow tube having external vortex sensors in accordance with an embodiment of the present invention.

FIG. 2A is a diagrammatic view of a portion of a flow tube, such as flow tube 102 with a shedder bar 118 disposed within a fluid flow. As shown in FIG. 2A, a first piezoelectric film sensor 150 is positioned on a first side of the flow tube 102 from shedder bar 118. A second piezoelectric film sensor 152 is disposed on an opposite side of flow tube 102 from first piezoelectric film sensor 150. As vortices are shed on alternate sides of shedder bar 118, these fluid vortices interact with the sidewall of flow tube 102 to such an extent that the piezoelectric film can sense the strain in the sidewall caused by the impingement of the respective vortex.

Figure 2B:
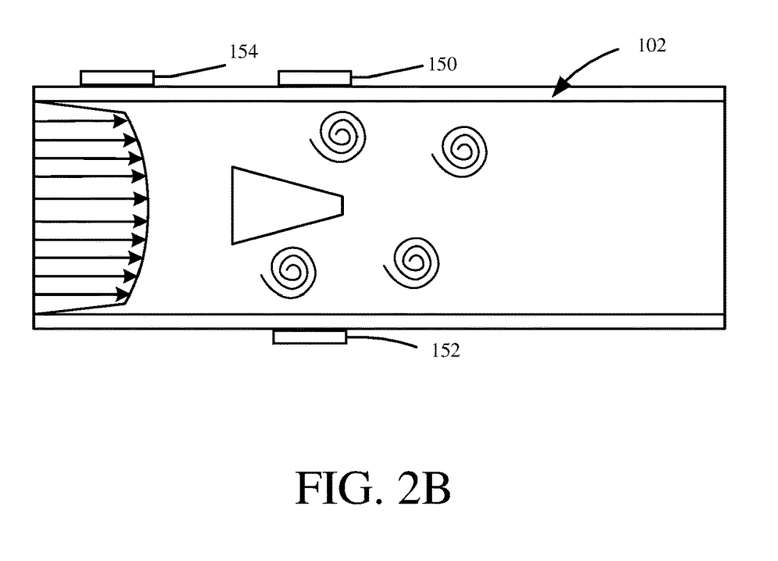
FIG. 2B is a diagrammatic view of a flow tube having external vortex sensors and flow noise sensor in accordance with an embodiment of the present invention.

FIG. 2B is similar to FIG. 2A a like components are numbered similarly. The main difference between the embodiment shown in FIG. 2B and the embodiment shown in FIG. 2A is the addition of at least one upstream piezoelectric film sensor 154. As shown, sensor 154 is positioned upstream of shedder bar 118, on any side(s) of flow tube 102. While a single upstream piezoelectric film sensor is shown in FIG. 2B, it is expressly contemplated that embodiments of the present invention include more than one upstream piezoelectric film sensor. In fact, such embodiments may allow an upstream sensor to be matched with a downstream sensor in order to simplify processing or removal of noise components.

In one computational analysis, it was determined that deformation of the flow tube of a vortex flowmeter on opposite sides of the bluff body or shedder bar would be equal to approximately 2.5 micro strain and that an output voltage from a piezoelectric film in such location would be approximately 30 millivolts, for a Mechano-Electrical conversion factor where the piezoelectric film sensors equal 12 millivolts per micro strain. In order to verify the simulation, a vortex flowmeter of size DN80 (3 inch) with piezoelectric film sensors was built where the piezoelectric film sensors were attached on opposite sides of the flow tube. The piezoelectric film type was type SDT1-028K, available from Measurement Specialties, of Hampton, Va.

Figure 3A:
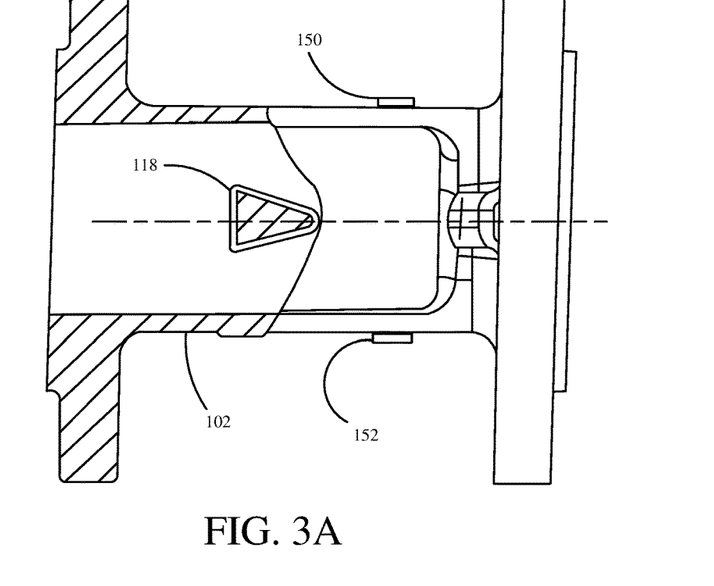
FIG. 3A is a diagrammatic view showing the relative positioning of a shedder bar and piezoelectric film sensors in accordance with an embodiment of the present invention.

FIG. 3A is a diagrammatic view showing the relative positioning of shedder bar 118 and piezoelectric film sensors 150, and 152 in accordance with another embodiment of the present invention. Shedder bar 118 is positioned such that it is approximately centered on the center line of flow tube 102. Further, shedder bar 118 is positioned just ahead of the midpoint between the mounting flanges. In the embodiment illustrated in FIG. 3A, fluid flows from the left side of the flow tube assembly to the right side. Thus, in contrast to the embodiment shown in FIG. 2A, piezoelectric film sensors 150 and 152 are positioned downstream of shedder bar 118, on opposite sides of flow tube 102.

Figure 3B:
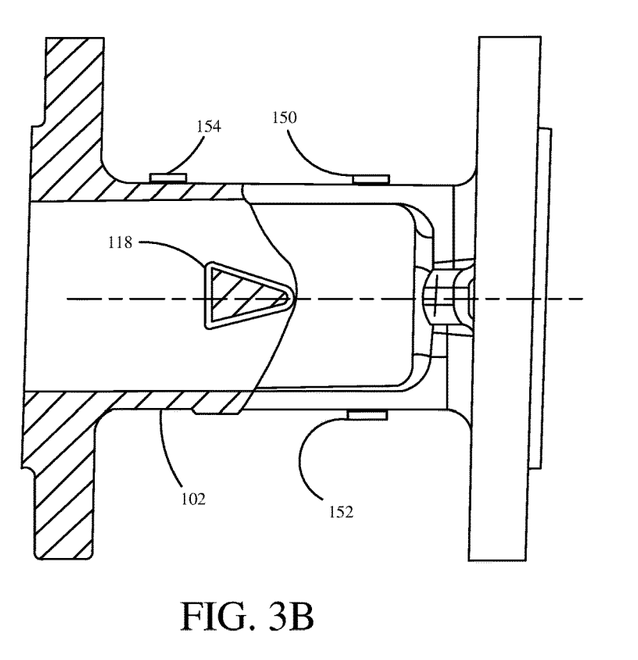
FIG. 3B is a diagrammatic view showing the relative positioning of a shedder bar and piezoelectric film sensor disposed upstream and downstream of a shedder bar in accordance with an embodiment of the present invention.

FIG. 3B is a similar FIG. 3A and like components are numbered similarly. The main difference between the embodiment shown in FIG. 3B and that of FIG. 3A is the inclusion of upstream piezoelectric film sensor 154. As shown, upstream piezoelectric film sensor 154 is positioned upstream of shedder bar 118, on any side(s) of flow tube 102.

While a pair of piezoelectric film sensors 150, 152 are shown in FIG. 3A, it is expressly contemplated that different numbers of piezoelectric film sensors can be used to sense the external deformation or strain of flow tube 102 in accordance with the embodiments of the present invention. For example, a single piezoelectric film sensor may be able to sense sufficient deformations to provide meaningful vortex flow frequency information. This is especially so if the single piezoelectric film sensor essentially is wrapped about the entire outer circumference of flow tube 102. Additionally, more than two piezoelectric film sensors may also be used in accordance with the embodiments of the present invention. For example, a piezoelectric film sensor 154, as shown in FIG. 3B, disposed upstream of shedder bar 118 may allow for some degree of common mode noise reduction. For example, if an upstream pump is providing pressure fluctuations in the process fluid, an upstream sensor could sense such disturbances of fluctuations on the pipe sidewall, such that they could be removed from the signals generated by the downstream piezoelectric film sensors. Such removal could be done in any suitable manner, but in one embodiment would include a digital analysis of the upstream sensor signal in order to identify certain frequency characteristics, such as pump pulsations, such that that particular frequency could be attenuated or otherwise removed from the signals provided by the downstream piezoelectric film sensors.

Figure 4A:
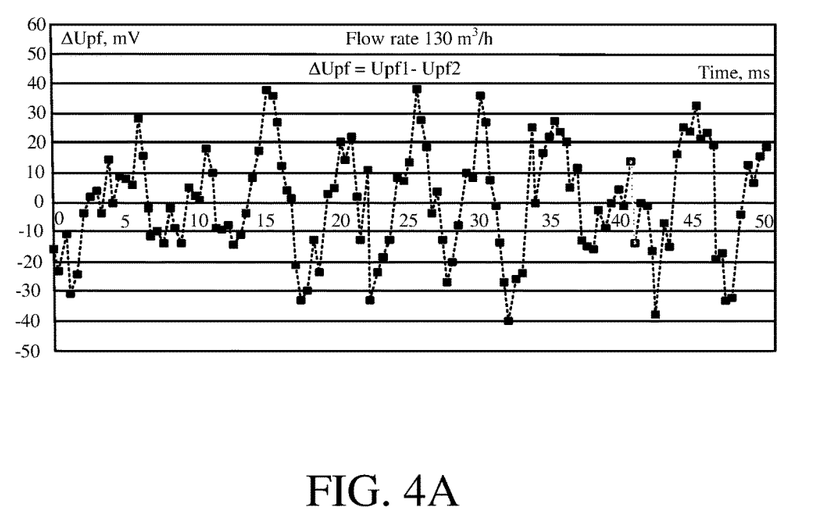
FIGS. 4A and 4B are signal graphs of from a vortex flowmeter in accordance with an embodiment of the present invention.
Figure 4B:
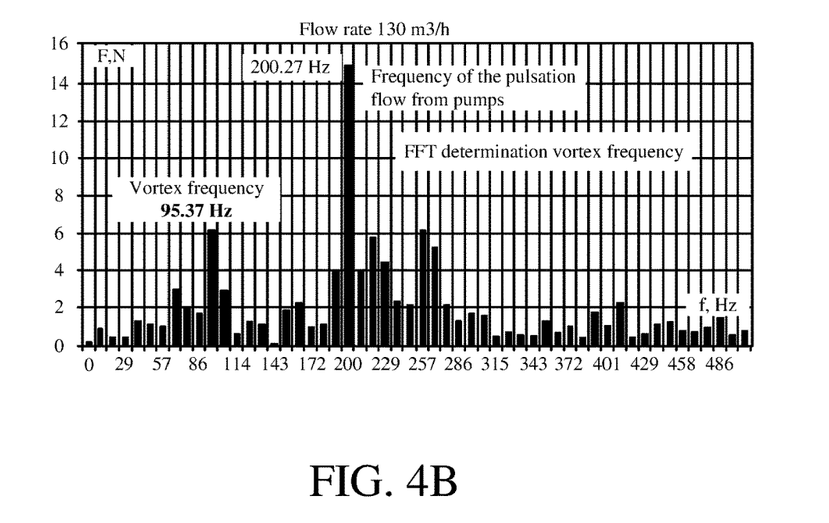

FIGS. 4A and 4B are signal graphs of from a vortex flowmeter in accordance with an embodiment of the present invention. Output voltages Upf1 and Upf2 from piezoelectric film sensors 150, 152, respectively, were measured by a multichannel digital oscilloscope. Difference signal ΔUpf was calculated based upon the difference between Upf1 and Upf2. The frequency of the vortices was determined using a Fast Fourier Transform (FFT). As shown in FIG. 4A, ΔUpf is expressed in millivolts on the vertical scale while time, in milliseconds is expressed on the horizontal scale. Further, FIG. 4B shows a signal spectrum of the ΔUpf signal for a flow rate of 130 cubic meters per hour. As can be seen in FIG. 4B, a number of frequency peaks are shown. A first frequency peak, corresponding to vortex frequency, is shown at 95.37 Hz. Additionally, a more significant frequency peak is shown at 200.27 Hz. The peak at 200.27 Hz. is the frequency from the pulsation flow from one or more pumps that convey the water in the prototype test. As set forth previously, an upstream piezoelectric sensor would certainly measure flow noise such as pulsation from the pumps and an analysis thereof would indicate that the 200 hertz frequency range should be ignored when calculating or otherwise determining vortex frequency in accordance with embodiments of the present invention.

Figure 5A:
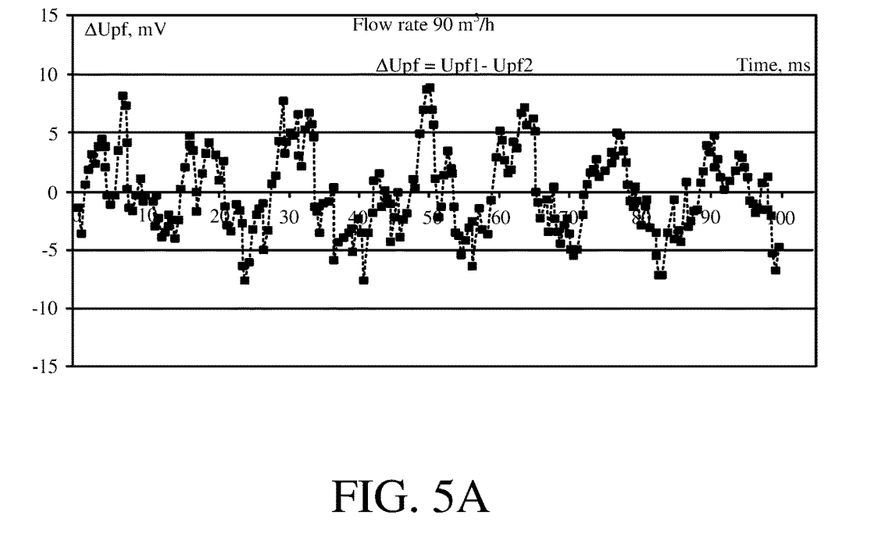
FIGS. 5A and 5B is a similar set of graphs as FIGS. 4A and 4B for a lower fluid flow rate.
Figure 5B:
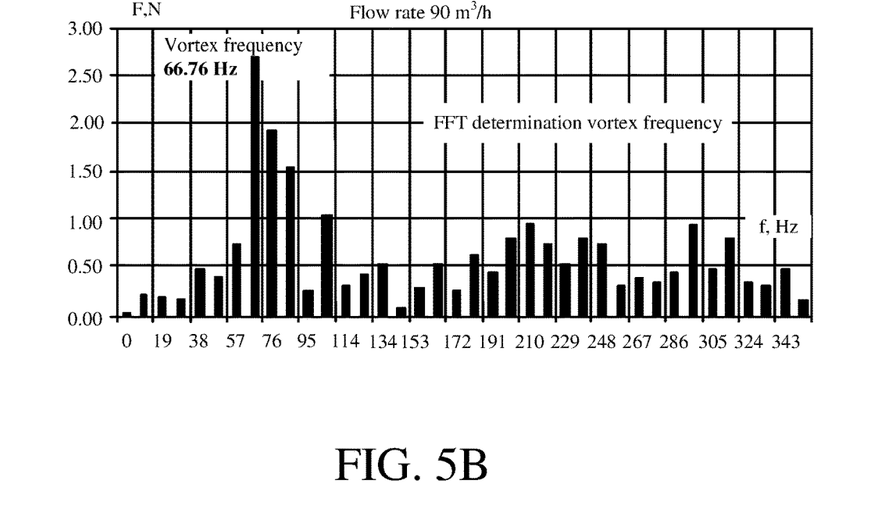
Figure 6A:
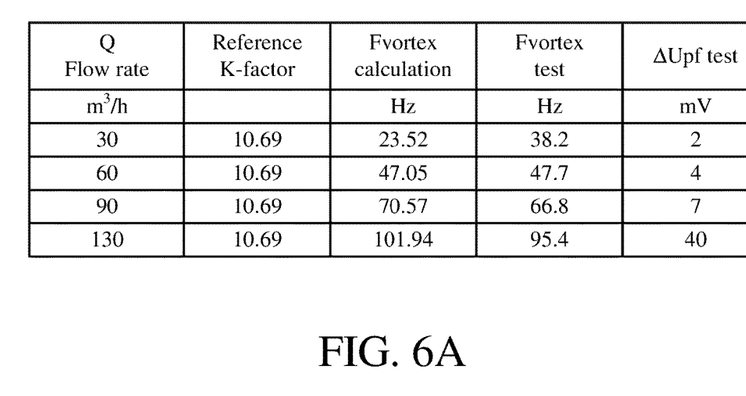
FIG. 6A shows the vortex frequency test result measurement and vortex frequency calculations.
Figure 6B:
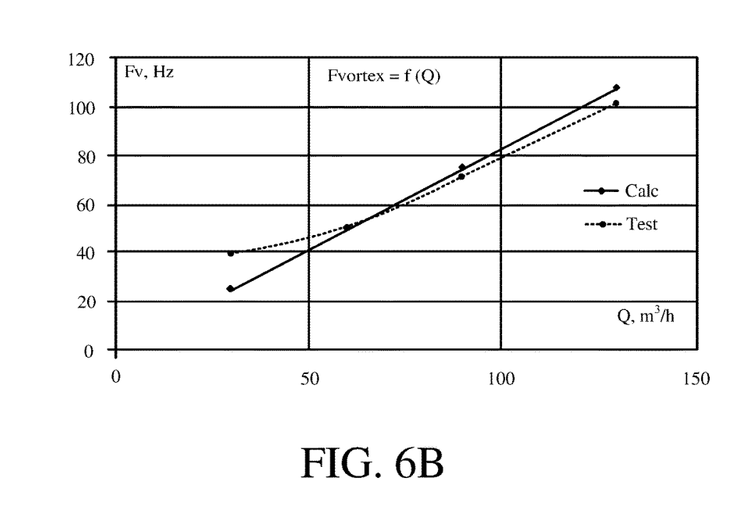
FIG. 6B shows a graph of vortex frequency vs flow rate.

FIGS. 5A and 5B is a similar set of graphs as FIGS. 4A and 4B for a lower fluid flow rate. In the testing depicted in FIGS. 5A and 5B, a water flow rate of 90 cubic meters per hour was used. As shown particularly in FIG. 5B, frequency analysis of the signal spectrum indicates a peak at 66.76 Hz. that is the vortex frequency. Similar analyses at 60 cubic meters per hour and 30 cubic meters per hour indicated respective vortex frequencies of 47.68 Hz. and 38.15 Hz. These results were compared with vortex calculations and the various measured flow rates based on measured vortex frequency generally agreed with the calculated vortex frequency, at least for the three higher flow tests illustrated in FIG. 6B. The table in FIG. 6A shows the measured vortex frequency from the test results compared to vortex frequency calculated using calibration K-factor vortex flowmeter. A comparison of the vortex frequency obtained in the test and the calculated values shows a relatively linear dependency on the flow rate.

Figure 7A:
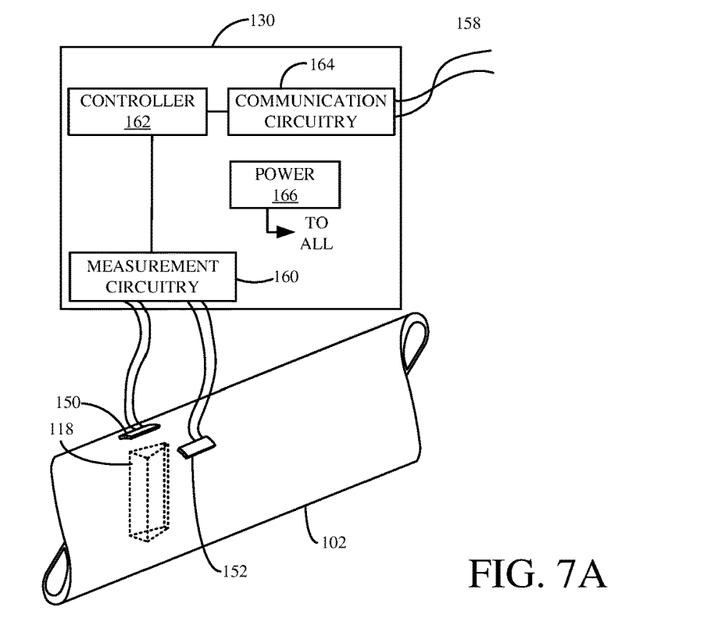
FIG. 7A is a diagrammatic view of a vortex flow transmitter in accordance with an embodiment of the present invention.

FIG. 7A is a diagrammatic view of a vortex flow transmitter in accordance with another embodiment of the present invention. As shown in FIG. 7A, a flow tube assembly includes flow tube 102 having a shedder bar 118 mounted therein. Additionally, in the embodiment shown in FIG. 7A, a pair of piezoelectric film sensors 150, 152 are mounted externally to flow tube 102 on opposite sides of shedder bar 118 on the outside of flow tube 102.

Figure 7B:
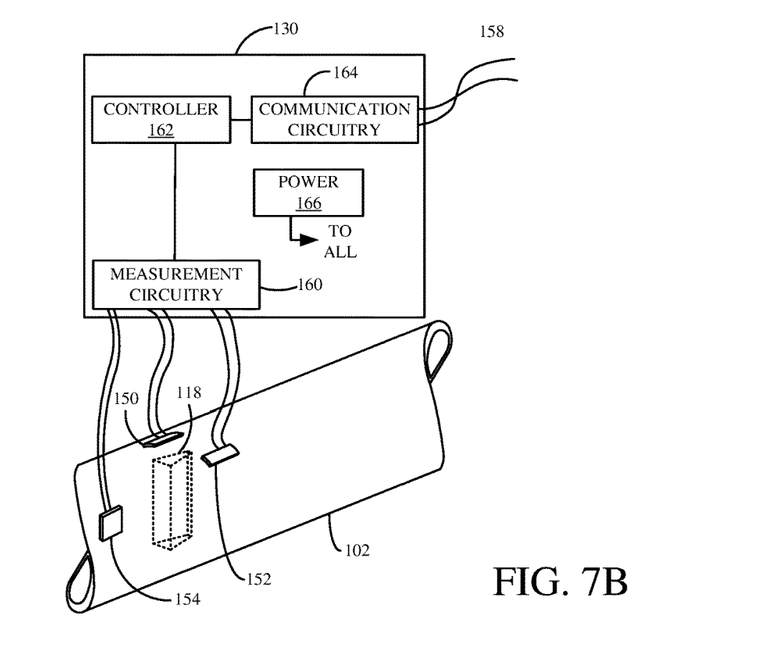
FIG. 7B is a diagrammatic view of a vortex flow transmitter with a connected optional piezoelectric film sensors in accordance with an embodiment of the present invention.

FIG. 7B is a similar FIG. 7A and like components are numbered similarly. The main difference between the embodiment shown in FIG. 7B and that of FIG. 7A is the inclusion of upstream piezoelectric film sensor 154. As shown, upstream piezoelectric film sensor 154 is positioned upstream of shedder bar 118, on any side(s) of flow tube 102.

Each of piezoelectric film sensors 150, 152, 154 is electrically coupled to measurement circuitry 160 of transmitter circuitry 130. Measurement circuitry 160 generally includes one or more suitable analog-to-digital converters specified to have bandwidth high enough to capture the pulsation events of the flow tube sidewall. Referring back to some of the test results relative to a prototype sensor, suitable results were obtained with measurement circuitry that was able to transduce 25 measurements in 10 milliseconds. Additionally, if higher-bandwidth sensors are used, multiple data points may be averaged in order to increase data fidelity. Measurement circuitry 160 is coupled to controller 162, which, in one embodiment, is a microprocessor.

Microprocessor 162 is configured, through hardware, software, or a combination thereof, to analyze the digital signals provided by measurement circuitry 160 and provide a process fluid flow rate based upon vortex frequency and, as an option, flow noise. As set forth above, controller 162 may perform a Fast Fourier Transform of the vortex sensor signals in order to identify vortex frequency and/or to identify frequencies of other artifacts that may cause noise or error. Controller 162 is coupled to communication circuitry 164 which can interact with a process communication loop or segment using any suitable process communication protocol, such as the Highway Addressable Report Transducer (HART®), FOUDATION™ Fieldbus, or others. Additionally, in embodiments where the vortex flowmeter communicates wirelessly, communication circuitry 164 may support a wireless process communication protocol, such as that in accordance with IEC 62591 (WirelessHART).

Flowmeter electronics 130 also include power circuitry 166 that provides suitable power to all components of circuitry 130. In embodiments where the vortex flowmeter is coupled to a wired process communication loop or segment via conductors 158, power module 166 may receive and suitably condition electrical power from the wired process communication loop in order to provide operating power to the components of circuitry 130. Accordingly, some embodiments of the present invention may be wholly powered by the process communication loop or segment to which they are coupled. In other embodiments, when the vortex flow transmitter is not coupled to a wired process communication loop or segment, power module 166 may include a suitable battery or energy source to provide electrical power to the components of circuitry 130 for a suitable period of time.

Figure 8:
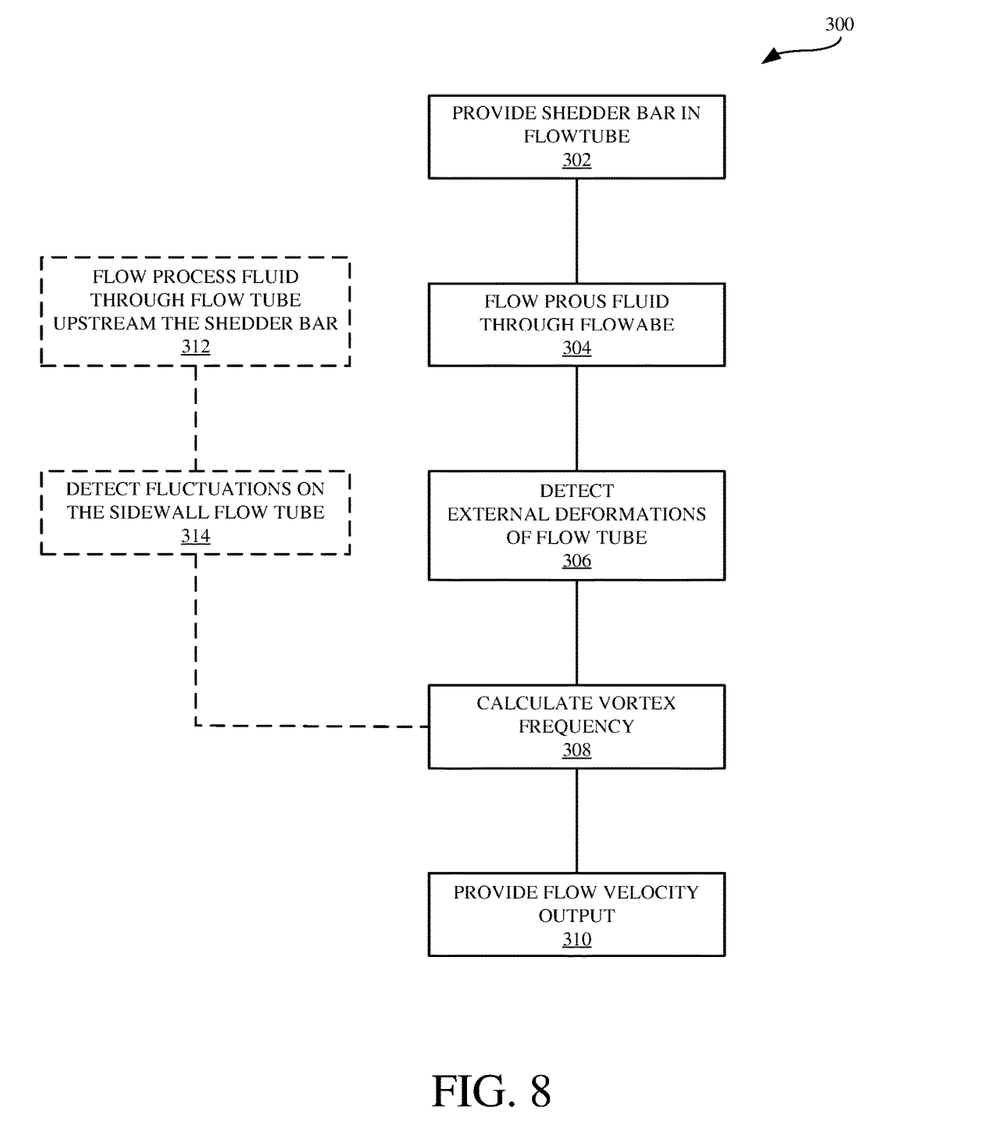
FIG. 8 is a flow diagram of a method of providing a flow velocity output based on vortex sensing and, as an option, flow noise in accordance with an embodiment of the present invention.

FIG. 8 is a flow diagram of a method of providing a flow velocity output based on vortex sensing in accordance with an embodiment of the present invention. Method 300 begins at block 302 where a shedder bar is provided within a flow tube. The shedder bar is specifically configured to generate vortices in the fluid as the fluid flows by the shedder bar. The shedder bar may take any suitable shape, such as those currently known or later developed. In one example, the shedder bar may have a relatively flat leading surface, and tapered sidewalls extending to a relatively narrow rear surface, such as is shown in FIG. 2.

Next, at block 304, process fluid is caused to flow through the flow tube. When the process fluid flows through the flow tube, it generates alternating vortices as it flows past the shedder bar. At block 306, external deformations of the flow tube are detected using one or more sensors mounted to or otherwise coupled to the flow tube. As set forth above, as the vortices impinge upon or otherwise interact with the internal sidewall of the flow tube, the flow tube itself will experience a detectable deformation. In one embodiment, this deformation is detected using one or more piezoelectric film sensors. However, method 300 can be practiced with any suitable deformation detection method or technique.

Next, at block 308, vortex frequencies are calculated based on the deformations detected in block 306. In one embodiment, vortex frequency can be calculated by performing frequency analysis on the deformation detection signal. One example of such frequency analysis is the Fast Fourier Transform. Finally, at block 310 the calculated vortex frequency is used to provide a flow velocity output signal. This flow velocity output signal can be indicated locally by the vortex flowmeter and/or communicated to one or more remote devices, as appropriate.

As an option, at block 312, process fluid is caused to flow through the flow tube. When the process fluid flows through the flow tube upstream the shedder bar, it generates flow noise. At block 314, external deformations of the flow tube from flow noise are detected using one or more sensors mounted on any or opposite sides of flow tube. At block 308, vortex frequencies are calculated based on the deformations detected in block 306 and deformations of the flow tube from flow noise. In one embodiment, vortex frequency can be calculated by performing frequency analysis on the deformation detection total signal. One example of such frequency analysis is the Fast Fourier Transform. Finally, at block 310 the calculated vortex frequency is used to provide a flow velocity output signal. This flow velocity output signal can be indicated locally by the vortex flowmeter and/or communicated to one or more remote devices, as appropriate.

Although the present invention has been described with reference to preferred embodiments, workers skilled in the art will recognize that changes may be made in form and detail without departing from the spirit and scope of the invention. For example, while embodiments of the present invention have generally been described with respect to piezoelectric film sensors, such sensors are merely examples of sensors with suitable sensing abilities to externally detect impingement of vortices on the flow tube. Thus, other types of sensors, either now known or later developed may be able to be used in accordance with embodiments of the present invention.

What is claimed is:

1. A vortex flowmeter comprising:
   a flow tube having a first end and a second end;
   a shedder bar disposed within the flow tube between the first end and the second end, the shedder bar being configured to generate vortices in fluid flowing through the flow tube;
   a first sensor coupled to measurement circuitry of the vortex flowmeter to provide a first sensor signal, the first sensor being mounted to an external surface of the flow tube downstream of the shedder bar;
   a second sensor coupled to the measurement circuitry of the vortex flowmeter to provide a second sensor signal, the second sensor being mounted to the external surface of the flow tube downstream of the shedder bar; and
   wherein the each of first sensor signal and the second sensor signal is configured to detect individual deformations of the flow tube resulting from vortices inside the flow tube.

2. The vortex flowmeter of claim 1, wherein the first sensor is a piezoelectric film sensor.

3. The vortex flowmeter of claim 2, wherein the second sensor is a piezoelectric film sensor.

4. The vortex flowmeter of claim 1, further comprising at least one additional sensor coupled to the external surface of the flow tube upstream of the shedder bar.

5. The vortex flowmeter of claim 4, further comprising a controller coupled to the measurement circuitry and configured to generate a process fluid flow output based on vortex frequency detection.

6. The vortex flowmeter of claim 5, wherein the controller is configured to perform a frequency analysis of a signal from at least one of the first and second sensors to detect vortex frequency.

7. The vortex flowmeter of claim 6, wherein the frequency analysis is a Fast Fourier Transform (FFT).

8. The vortex flowmeter of claim 5, wherein the controller is configured to perform an analysis of a signal from at least one sensor mounted to the external surface of the flow tube upstream from the shedder bar to detect flow noise and at least one of the first and second sensor to detect vortex frequency.

9. The vortex flowmeter of claim 4, wherein the at least one additional sensor is a piezoelectric film sensor.

10. The vortex flowmeter of claim 1, wherein the first sensor is opposite the second sensor.

11. A method of detecting a flow rate of a fluid, the method comprising:
   providing a flow tube to receive the flow of fluid;
   providing a fixed structure that generates vortices as the fluid flows by the fixed structure;
   detecting deformations of an external surface of the flow tube based on physical interactions between the vortices and the flow tube as detected by a plurality of sensors mounted to the external surface of the flow tube, the plurality of sensors being electrically coupled to measurement circuitry of a vortex flowmeter;
   using the detected deformations to determine vortex frequency with a controller of the vortex flowmeter; and
   providing a vortex flowmeter flow rate output based on the vortex frequency.

12. The method of claim 11, wherein providing the fixed structure includes mounting a shedder bar within the flow tube.

13. The method of claim 11, wherein at least one of the plurality of sensors is a piezoelectric film sensor.

14. The method of claim 11, wherein detecting deformations of an external surface of the flow tube is performed at two different locations on the flow tube.

15. The method of claim 14, wherein the two different locations are on opposite sides of the flow tube.

16. The method of claim 14, wherein the two different locations are downstream from the fixed structure.

17. A vortex flowmeter comprising:
   flowmeter electronics including a controller configured to determine a vortex frequency and provide a fluid flow rate output, the flowmeter electronics also including measurement circuitry coupled to the controller;
   a flow tube having a first end and a second end;
   a shedder bar disposed within the flow tube to generate vortices in fluid flowing through the flow tube; and
   a plurality of piezoelectric film sensors, each being coupled to the measurement circuitry of the flowmeter electronics and mounted to an external surface of the flow tube, the plurality of piezoelectric film sensors being configured to detect deformation of the flow tube resulting from vortices impinging the flow tube.

* * * * *

UNITED STATES PATENT AND TRADEMARK OFFICE
CERTIFICATE OF CORRECTION

PATENT NO. : 10,365,134 B2
APPLICATION NO. : 15/358718
DATED : July 30, 2019
INVENTOR(S) : Vladimir Bogdanov et al.

Page 1 of 1

It is certified that error appears in the above-identified patent and that said Letters Patent is hereby corrected as shown below:

In the Drawings

Figure 8, Block 304, "PROUS" should be "PROCESS"

Figure 8, Block 304, "FLOWABE" should be "FLOW TUBE"

Signed and Sealed this
Fourth Day of February, 2020

Andrei Iancu
*Director of the United States Patent and Trademark Office*